United States Patent
Holcombe et al.

(10) Patent No.: US 6,350,289 B1
(45) Date of Patent: Feb. 26, 2002

(54) TWO-ZONE MOLTEN METAL HYDROGEN-RICH AND CARBON MONOXIDE-RICH GAS GENERATION PROCESS

(75) Inventors: Thomas C. Holcombe, Neshanic Station, NJ (US); Donald P. Malone, Grayson, KY (US)

(73) Assignees: Marathon Ashland Petroleum LLC, Miamisburg; Envires LLC, Findlay, both of OH (US)

( * ) Notice: Subject to any disclaimer, the term of this patent is extended or adjusted under 35 U.S.C. 154(b) by 0 days.

(21) Appl. No.: 09/308,524
(22) PCT Filed: Nov. 25, 1996
(86) PCT No.: PCT/US96/19081
  § 371 Date: May 18, 1999
  § 102(e) Date: May 18, 1999
(87) PCT Pub. No.: WO98/23707
  PCT Pub. Date: Jun. 4, 1998

Related U.S. Application Data

(63) Continuation-in-part of application No. 08/421,102, filed on Apr. 13, 1995, now Pat. No. 5,577,346.

(51) Int. Cl.[7] .................................................. C10J 3/06
(52) U.S. Cl. ........................ 48/197 R; 48/92; 48/198.2
(58) Field of Search .......................... 48/92, 197 R, 48/198.2, 202, 206, 209, 210; 75/10.41, 501, 503, 506, 516, 557; 252/373, 374

(56) References Cited

U.S. PATENT DOCUMENTS

| | | | |
|---|---|---|---|
| 1,803,221 A | * 4/1931 | Tyrer | 423/650 |
| 3,330,645 A | * 7/1967 | De Moustier et al. | 75/557 |
| 3,614,083 A | * 10/1971 | Holmes | 266/270 |
| 3,639,261 A | * 2/1972 | Slater | 252/373 |
| 3,672,853 A | * 6/1972 | Reman et al. | 44/457 |
| 3,895,784 A | * 7/1975 | Kolb et al. | 266/81 |
| 3,945,820 A | * 3/1976 | Brotzmann et al. | 75/10.41 |
| 3,959,972 A | * 6/1976 | Rudolph et al. | 60/651 |
| 4,187,672 A | 2/1980 | Rasor | |
| 4,309,024 A | * 1/1982 | Lillybeck et al. | 266/138 |
| 4,338,095 A | 7/1982 | Mayes | |
| 4,392,886 A | * 7/1983 | Kodaka et al. | 75/539 |
| 4,496,369 A | * 1/1985 | Törneman | 48/92 |
| 4,511,372 A | * 4/1985 | Axelsson | 48/197 R |
| 4,574,714 A | 3/1986 | Bach et al. | |
| 4,602,574 A | * 7/1986 | Bach et al. | 588/201 |

FOREIGN PATENT DOCUMENTS

| | | | |
|---|---|---|---|
| GB | 1187782 | * | 4/1970 |
| GB | 2189504 A | * | 10/1987 |

* cited by examiner

*Primary Examiner*—Hien Tran
(74) *Attorney, Agent, or Firm*—Richard D. Stone

(57) ABSTRACT

A high pressure two-zone molten iron gasification process for converting solid, liquid and gaseous hydrocarbon feeds into separate substantially hydrogen-rich and carbon monoxide-rich streams at 2 to 200 atmospheres pressure by feeding hydrocarbons into the molten iron in a first zone (4) in which hydrogen-rich gas is formed and then circulating the molten iron into contact with an oxygen containing gas in a second zone (5) in which carbon monoxyide-rich gas is formed. The carbon level in the circulating molten iron is carefully controlled above 0.3 wt. % to minimize formation of FeO. Hydrogen sulfide and other volatile sulfur compounds are removed from the separate gas streams via scrubbing in downstream equipment (12 and 16).

18 Claims, 3 Drawing Sheets

TWO-ZONE MOLTEN METAL HYDROGEN-RICH AND CARBON MONOXIDE-RICH GAS GENERATION PROCESS

This application is a Continuation-in-Part to U.S. Ser. No. 08/421,102, filed Apr. 13, 1995, now U.S. Pat. No. 5,577,346.

CROSS REFERENCE TO RELATED APPLICATIONS

This application is related to, filed May 18, 1999, U.S. application Ser. No. 09/308,523, and, May 18, 1999, U.S. application Ser. No. 09/308,530.

BACKGROUND OF THE INVENTION

I. Field of the Invention

This invention relates to a process of conversion of hydrocarbons via gasification into two high pressure gas streams: a hydrogen-rich stream and a carbon-monoxide-rich stream. More specifically, this invention relates to the use of a two-zone predominantly molten iron or molten iron alloy system in conjunction with the above gasification conversion.

II. Discussion of the Prior Art

Two-zone molten iron gasifiers are disclosed by:

U.S. Pat. No. 1,803,221 (1931) to Tyrer describes hydrogen-rich gas production by feeding methane or a methane-steam mixture into one molten iron zone below the surface of the metal, thereby assuring complete reaction of the gaseous feed. The carbon which dissolves in the molten iron in the first zone is burned out of the molten iron in the second zone with an oxygen containing gas. Additional oxygen containing gas may be added to the combustion products leaving the second zone to completely oxidize to carbon dioxide any carbon monoxide remaining.

The disadvantages of the process described in this patent include:

The feedstocks are limited to hydrocarbon gases such as methane and do not include lower value hydrocarbon liquids or solids.

Operating pressure is nominally atmospheric pressure which is less economical to operate than equipment producing hydrogen at elevated pressures; two atmospheres and above.

The importance of controlling the carbon level in the molten iron is not considered and thus production of only lower purity hydrogen-rich gas is possible. If a minimum carbon level of at least 0.3% is not maintained, excess iron oxide will form in the molten iron during oxidation and will be converted to carbon monoxide and dilute the hydrogen-rich gas when hydrocarbon feeds are introduced to the hydrogen-rich gas producing first zone.

U.S. Pat. Nos. 4,187,672 (1980) and 4,244,180 (1981) to Rasor describe a hydrocarbon gasification process in which solid hydrocarbons such as coal are introduced on the surface of one molten iron bath zone in which high temperature cracking of the hydrocarbons into lighter molecular weight materials takes place with residual carbon being dissolved in the molten iron. The cracked hydrocarbon products are removed via outlets in the shaft through which the feed hydrocarbon solids enter the molten iron. The molten iron containing the carbon is transferred to the second molten iron zone in which an oxygen containing gas is introduced to convert the carbon into carbon monoxide and raise the temperature of the iron for transfer back to the carbonization section. The carbon monoxide is further oxidized above the molten iron bath and the heat recovered via a boiler or similar system. Sulfur, if present in the feed, is removed via slag formation on top of the molten iron. The disadvantages of the process described in this patent include.

The feedstocks are limited to solid hydrocarbons such as coal and do not include lower value hydrocarbon liquids or gases.

Since the solid hydrocarbon feeds are introduced above the surface of the molten iron, cracking of the feeds occurs such that a very impure hydrogen gas stream is produced because of the presence of cracked hydrocarbon gases.

Since the product gas from the oxidation zone is further oxidized for energy recovery in, for example, a steam boiler, no attempt is made to produce a carbon monoxide-rich gas.

Sulfur removal from the solid feed via reaction with and removal of slag from the equipment is complicated and expensive.

Operating pressure is nominally atmospheric pressure, which is less economical to operate that equipment producing hydrogen at elevated pressures, two atmospheres and above.

The importance of controlling tile carbon level above 0.30% in the molten iron is not considered and thus production of only lower purity hydrogen-rich gas is possible.

U.S. Pat. No. 5,435,814 (1995) to Miller and Malone (Ashland) describes the general concept of a two-zone molten iron system process operating at high pressures, up to 100 atmospheres, with solid and liquid feed introduction below the surface of the molten iron and production of a hydrogen-rich and carbon monoxide rich gas streams. The disadvantages of the process described in this patent include:

There is no method described for handling the feedstock sulfur.

The importance of controlling the carbon level in the molten iron is not considered and thus production of only lower purity hydrogen-rich gas may be possible. The process is restricted to a particular method of circulating molten iron.

In summary, all of the above patents operate at atmospheric pressure and do not control carbon at a minimum of 0.3% in molten iron. Furthermore, the Rasor patents do not inject feed below the surface of the molten iron and are restricted to solids feeds. Furthermore, all the patents ignore sulfur in the feed or use slag to remove it.

One-zone molten metal gasifiers are disclosed by:

U.S. Pat. No. 4,496,369 (1985) to Torneman and U,S. Pat No. 4,511,372 (1985) to Axelsson in which coal or other liquid hydrocarbons are injected advantageously below the surface of the molten iron along with oxygen and water vapor to form a mixed hydrogen and carbon monoxide gas. Iron oxides are also added to the molten iron to act as a coolant for the melt. The primary objective of the invention is to produce gasified hydrocarbons and it is disclosed that production can be increased by operating at high pressures. The high pressures are not only economic because of the reduced size of equipment but it is also disclosed that high pressure decreases the degree of refractory wear in the reactor and the amount of dust carry-over in the gas from the reactor. In addition, it is disclosed that a higher sulfur level in the molten bath will also reduce the amount of dust carry-over from the reactor. The process disclosed cites the advantage of maintaining the carbon content of the bath below 0.8% carbon to reduce the amount of dust carry-over from the reactor.

The primary disadvantage of the process described in this patent include the lack of separate molten iron zones for gasification and thereby does not permit production of individual hydrogen-rich and carbon monoxide-rich gas streams.

U.S. Pat. Nos. 4,574,714 and 4,602,574 (1986) to Bach and Nagel in which solid or liquid toxic and/or lower value hydrocarbons are injected advantageously below the surface of the molten iron alloy, along with oxygen specifically to destroy the toxic compounds. With appropriate feeds a mixed hydrogen and carbon monoxide gas can be formed and C1 chemistry may be utilized to advantage at times to produce useful products. It is further disclosed that maintaining a carbon level of 0.5–6% carbon, preferably 2–3% carbon in tile molten metal is desired to prevent refractory degradation and facilitate reaction kinetics by providing a high concentration gradient for toxics destruction. Sulfur, when present in the feed, is removed via absorption in the slag. The disadvantages of the process described in this patent include.

The feedstocks are introduced to the molten iron single zone system for destruction as hazardous materials and not to produce hydrogen-rich or carbon monoxide-rich gases and thereby misses the advantages of feeding non-hazardous feedstocks.

Sulfur removal from the solid feed via reaction with and removal of slag from the equipment is complicated and expensive.

Operating pressure is nominally atmospheric, which is less economical to operate than equipment producing gases at elevated pressures; two atmospheres and above. Also, rotating gasification vessels on trunnions for slag removal makes operating at higher pressures impractical.

The importance of controlling the carbon level in the molten iron at more than 0.3% is not considered and thus production of only lower purity hydrogen-rich gas is possible.

The primary disadvantage of the process described in this patent include the lack of separate molten iron zones for gasification and thereby does not permit production of individual hydrogen-rich and carbon monoxide-rich gas streams.

The following foreign patents also disclose processes related to that of this application.

U.K. Patent 1,187,782 (1970) to Nixon discloses a reactor in which a hydrocarbon is introduced to one zone resulting in the production of a hydrogen-rich gas and oxygen is introduced into a second zone where the carbon which was dissolved in the first zone is burned with oxygen to give the exothermic heat to maintain the appropriate temperature in the first zone. It is noted that the two zone system as described has an advantage over hydrogen production in a single zone system which is operated in "blocked out" operations equivalent to that of a two zone system. It is further disclosed that sulfur present in the iron may be removed, purifying to some extent the iron. The disadvantages of the process described in this patent include:

Since no attempt is made to produce a carbon monoxide-rich gas in the oxidation zone, only a hydrogen-rich gas stream is produced.

Operating pressure is nominally atmospheric pressure, which is less economical to operate than equipment producing hydrogen at elevated pressures; two atmospheres and above.

The importance of controlling the carbon level above 0.3% in the molten iron is not considered and thus production of only lower purity hydrogen-rich gas is possible.

One embodiment of U.K. Patent 1,437,750 (1976) to Agarwal and Ahner describes producing a combustible gas containing a ratio of hydrogen to carbon monoxide of between 2:5 to 10:1 using a two-zone molten iron reactor with a coal feed to the top of one zone. Although the gases are produced in separate zones after further conversion with, for example, the water gas shift reaction, they are combined so the product from the system is a single combustible gas. Carbon concentrations in the molten iron are between 1 and 3% in the first zone and between 3 and 5% in the second zone. The disadvantages of the process described in this patent include:

The feedstocks are limited to solid hydrocarbons such as coal and do not include lower value hydrocarbon liquids or gases.

Since the solid hydrocarbon feeds are introduced above the surface of the molten iron, cracking of the feeds occurs such that a very impure hydrogen gas stream is produced because of the presence of cracked hydrocarbon gases.

Since the product gas from the oxidation zone is combined with the gas from the first zone, no attempt is made to produce a carbon monoxide-rich gas.

No disclosure is made concerning sulfur removal from the solid feed via reaction in the molten metal zones.

Operating pressure is nominally atmospheric pressure, which is less economical to operate that equipment producing hydrogen at elevated pressures, two atmospheres and above.

U.K. Patent 2,189,504 (1987) to Herforth describes a two-zone molten iron reactor in which low grade solids fuels are gasified in one zone and high grade solid fuels are gasified in the second zone. This permits the low grade solid fuels and waste materials to be consumed and produce a low quality off-gas where as the gasification of high grade fuels in the second zone permits production of a high quality off-gas unmixed with the low quality off-gas while still permitting destruction of the low grade fuels or waste materials. The sulfur is removed in the slag formed in the reactors. The disadvantages of the process described in this patent include:

The feedstocks are limited to solid hydrocarbons such as coal and do not include lower value hydrocarbon liquids or gases.

Since the solid hydrocarbon feeds are introduced above the surface of the molten iron, cracking of the feeds occurs such that a very impure hydrogen gas stream is produced because of the presence of cracked hydrocarbon gases.

No attempts are made to produce either a hydrogen-rich or carbon monoxide-rich off-gas.

Sulfur removal from the solid feed via reaction with and removal of slag from the equipment is complicated and expensive.

Operating pressure is nominally atmospheric pressure, which is less economical to operate that equipment producing hydrogen at elevated pressures; two atmospheres and above.

French Patent 2,186,524 (1974) to Vayssiere describes a two-zone molten iron system with a hydrogen-rich gas generated from hydrocarbons injected beneath the surface of the molten iron in one zone and either a carbon monoxide-rich gas or mixture of hydrogen and carbon monoxide gas generated by injecting oxygen or oxygen and hydrocarbon into the second zone. The disadvantages of the process described in this patent include:

There is no provision for removal of the sulfur in the feed.

Operating pressure is atmospheric pressure, which is less economical to operate that equipment producing gases at elevated pressures; two atmospheres and above.

The importance of controlling the carbon level above 0.3% in the molten iron is not considered.

In summary, while such systems referenced above may provide reasonable results, none of them effect the production of a separate hydrogen-rich stream and a separate carbon monoxide-rich stream at elevated pressures by feeding hydrocarbons below the surface of the molten iron and with controlled carbon contents of the molten metal above 0.3%. Furthermore, these systems either have no provision for handling feed sulfur or use a complicated and costly slag technique for sulfur removal. Sulfur capture in the slag requires slagging materials to be added to the molten metal zones and a more complicated means of regularly drawing off the sulfur containing slag. When sulfur is captured in slag the slag must then be disposed of, typically in uneconomic and environmentally unsound landfills.

Thus, our survey of prior practices indicates that the prior art has not combined the use of two zone molten iron gasifiers for separate hydrogen-rich and carbon monoxide-rich gas production, feed introduction below the molten iron surface, high pressure operation and carbon content control of the molten iron in the manner we have.

SUMMARY OF THE INVENTION

Broadly, this invention involves a process for producing in separate streams a hydrogen-rich gas and a carbon monoxide-rich gas from two molten metal zones and necessary ancillary equipment. Molten metal components are intended to include any molten material layer within a particular zone; e.g., molten metals, such as iron and its alloys, which are always present and slag components, if present, that would form a second molten layer with such molten metals. The molten metal employed in this invention is preferably molten iron but may be copper, zinc, especially chromium, manganese, or nickel, or other meltable metal in which carbon is somewhat soluble and which is at least 50% molten iron by weight.

In the first molten metal zone, a hydrocarbon feed in the form of a relatively dry gas or liquid or solid or solid-liquid slurry or atomized solid or liquid is fed beneath the molten metal surface and a hydrogen-rich gas is produced. By relatively dry is meant below 1% by weight of water. By introducing the feed below the surface of the molten metal substantially complete chemical reactions and conversions to hydrogen and carbon of the feed can be achieved. The carbon in the hydrocarbon feed dissolves in the molten metal.

In the second molten metal zone, into which molten metal from the first molten metal zone flows, all oxygen bearing stream is introduced to convert the carbon dissolved in the molten metal from the first zone into a carbon monoxide-rich gas stream which exits from above the molten metal bath in a gas stream separate from the hydrogen-rich gas stream from the first molten metal zone. Molten metal from which the carbon has been gasified by oxygen in the second zone is returned to the first molten metal zone.

Both molten metal zones are operated at elevated pressures, above two atmospheres, to reduce the size of the equipment need to produce and further treat, if necessary, the hydrogen-rich and carbon-monoxide rich gases. In addition, as disclosed is U.S. Pat. No. 4,511,372 incorporated by reference, operation at high pressures reduces dust carry over and wear on refractory walls of the vessel. Furthermore, the capital and operating costs of compression, of these gases to pressures at which they are utilized commercially are eliminated or substantially reduced.

Furthermore, in this process the amount of carbon in the molten iron to which the hydrocarbon feed is introduced is carefully controlled to above 0.3% to minimize formation of high levels of FeO, ferrous oxide, which could include a separate FeO phase. High levels of FeO will react with the carbon in the hydrocarbon feed and produce high levels of carbon monoxide, thereby contaminating the hydrogen-rich stream. If a separate phase of FeO is present it will attack the refractory of the vessels holding the molten iron. The amount of carbon in the molten iron should not normally exceed an tipper limit as determined by its solubility in molten iron.

This invention also includes having the hydrogen-rich and carbon monoxide-rich gases flowing from die molten metal zones through separate product gas lines to pass through successive downstream coolers, scrubbers or other gaseous impurity removal devices, and knock-out drums to cool the gases and to remove any solids and any condensed liquids from the gas streams. The gases may further be fed to proven scrubbers which remove hydrogen sulfide and other volatile sulfur compounds produced in the molten metal zones and emit a substantially sulfur-free and carbon oxide-free hydrogen-rich product gas and a substantially sulfur-free carbon monoxide-rich product gas.

Suitable feeds for the process include carbonaceous reactant feedstocks selected from the group consisting of: light gaseous hydrocarbons such as methane, ethane, propane, butane, natural gas, and refinery gas; heavier liquid hydrocarbons such as naphtha, kerosene, asphalt, hydrocarbon residua produced by distillation or other treatment of crude oil, fuel oil, cycle oil, slurry oil, gas oil, heavy crude oil, pitch, coal tars, coal distillates, natural tar, crude bottoms, and used crankcase oil; solid hydrocarbon such as coal, rubber, tar sand, oil shale, and hydrocarbon polymers; and mixtures of the foregoing.

DETAILED DESCRIPTION OF THE INVENTION

Figure 1:
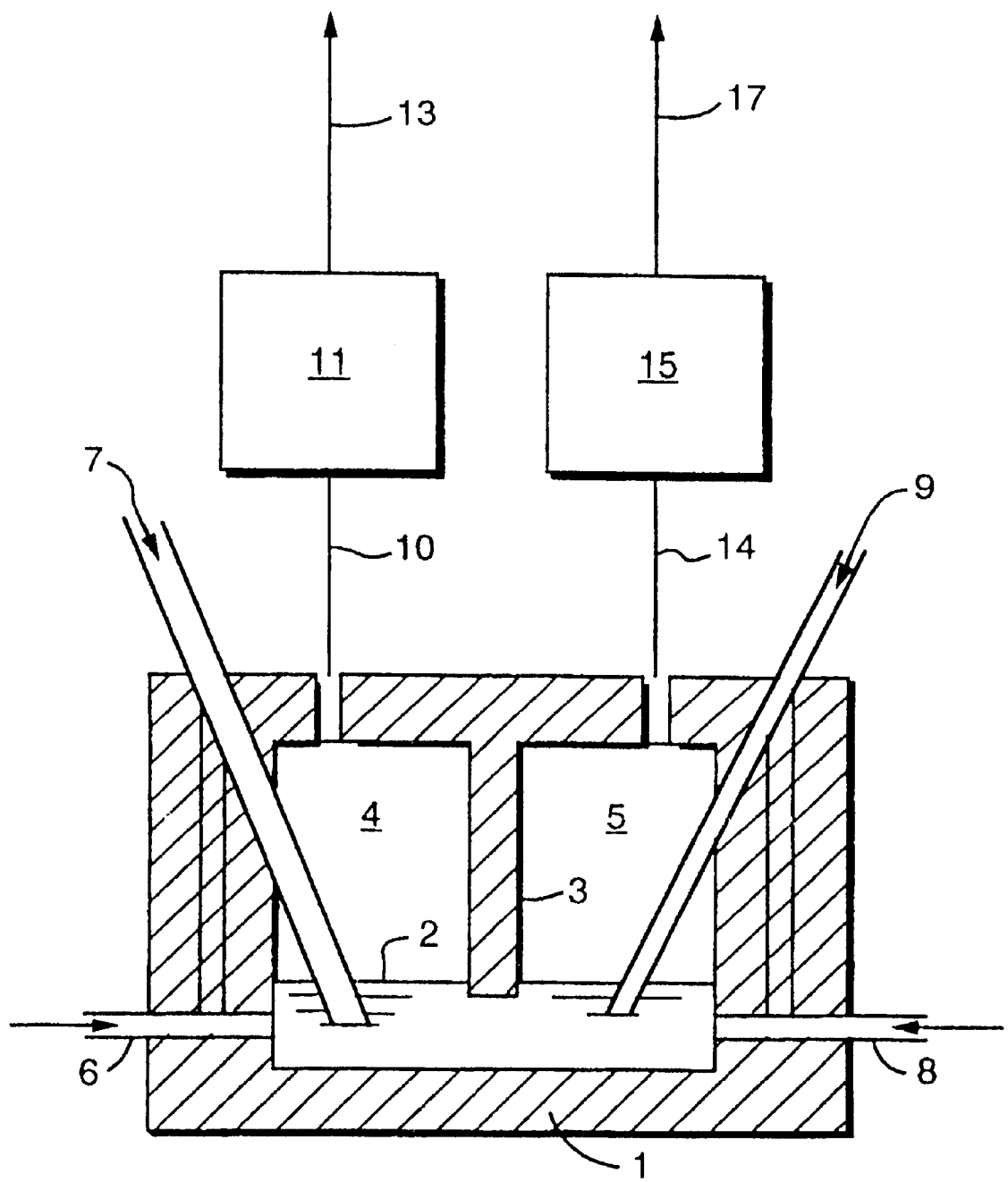
FIG. 1 is a drawing of the basic process of this invention.

FIG. 1 illustrates the invention in a simplified diagram of all apparatus for carrying out the basic process. Molten iron 2 is contained in the vessel 1. The molten iron in vessel 1 is maintained at a temperature of 1200–2500° C. between 1150° and 1750° C. (2102°–3182° F.) to keep it substantially liquid. Partition 3 divides the vessel into two zones 4 and 5. A hydrocarbon feed in the form of a relatively dry liquid or solid or solid-liquid slurry or atomized solid or liquid in a gas is fed through tuyere pipe 6 or lance pipe 7 beneath the molten metal surface of zone 4 in which the hydrocarbon is converted to a hydrogen-rich gas which escapes from the surface of the molten metal and carbon which dissolves in the molten metal. The hydrogen-rich gas exits zone 4 via pipe 10 and enters a cooling system 11 where it is cooled to temperatures suitable for its introduction into commercial hydrogen-rich gas consuming processes suitable equipment for controlling the pressure above 2 atmospheres (e.g. 2–2000 atmospheres) is provided before the hydrogen-rich gas is sent to a consuming process via pipe 13. Molten iron containing dissolved carbon from zone 4 is transferred to zone 5 and oxygen is introduced beneath the molten metal surface in zone 5 through tuyere pipe 8 or lance pipe 9. The carbon in the molten iron in zone 5 is converted to a carbon monoxide-rich gas in zone 5 and exits the vessel via pipe 14 and enters a cooling system 15 where it is cooled to temperatures suitable for its introduction into commercial carbon monoxide-rich gas consuming processes. Suitable equipment for controlling the pressure above 2 atmospheres is provided before the carbon-monoxide-rich gas is sent to a consuming process via pipe 17.

The following additional features characterize the process illustrated in FIG. 1:

Suitable feeds for the process introduced via tuyere pipe 6 or lance pipe 7 include carbonaceous reactant feedstocks selected from the group consisting of: light gaseous hydrocarbons such as methane, ethane, propane, butane, natural gas, and refinery gas; heavier liquid hydrocarbons such as naphtha, kerosene, asphalt, hydrocarbon residua produced by distillation or other treatment of crude oil, fuel oil, cycle oil, slurry oil, gas oil, heavy crude oil, pitch, coal tars, coal distillates, natural tar, crude bottoms, and used crankcase oil; solid hydrocarbon such as coal, rubber, tar sand, oil shale, and hydrocarbon polymers; and mixtures of the foregoing.

If the feeds introduced via tuyere pipe 6 or lance pipe 7 include sulfur, the sulfur will be removed from the system via its capture in a slag floating on the molten iron in zones 4 and 5. Or the sulfur will remain as hydrogen sulfide or other volatile sulfur compounds in the hydrogen-rich and carbon monoxide-rich gas streams and go to the gas consuming processes via pipes 13 and 17.

Any dust and fume generated as part of the process in zones 4 and 5 will be removed from the hydrogen-rich and carbon monoxide-rich gas streams via conventional means such as bag filters which are part of the gas cooling systems 11 and 15.

The amount of carbon in the molten iron which is returned to zone 4 from zone 5 to which the hydrocarbon feed is introduced is carefully controlled to above 0.3% at all times to minimize formation of a separate phase of FeO, ferrous oxide. If present in substantial amounts, the FeO will react with the carbon in the hydrocarbon feed entering via tuyere pipe 6 or lance pipe 7 and produce carbon monoxide thereby diluting the hydrogen-rich stream exiting zone 4 via pipe 10. In addition, FeO in a separate phase will attack the refractory lining of vessels holding the molten iron. The amount of carbon in the molten iron which passes from zone 4 to zone 5 should not normally exceed an upper limit as set by the solubility of carbon in molten iron.

The molten metal employed in this invention as bath 2 is preferably and predominantly molten iron but may be copper, zinc, especially chromium, manganese, or nickel, or other meltable metal in which carbon is somewhat soluble but is at all times at least 50 wt. % molten iron.

Figure 2:
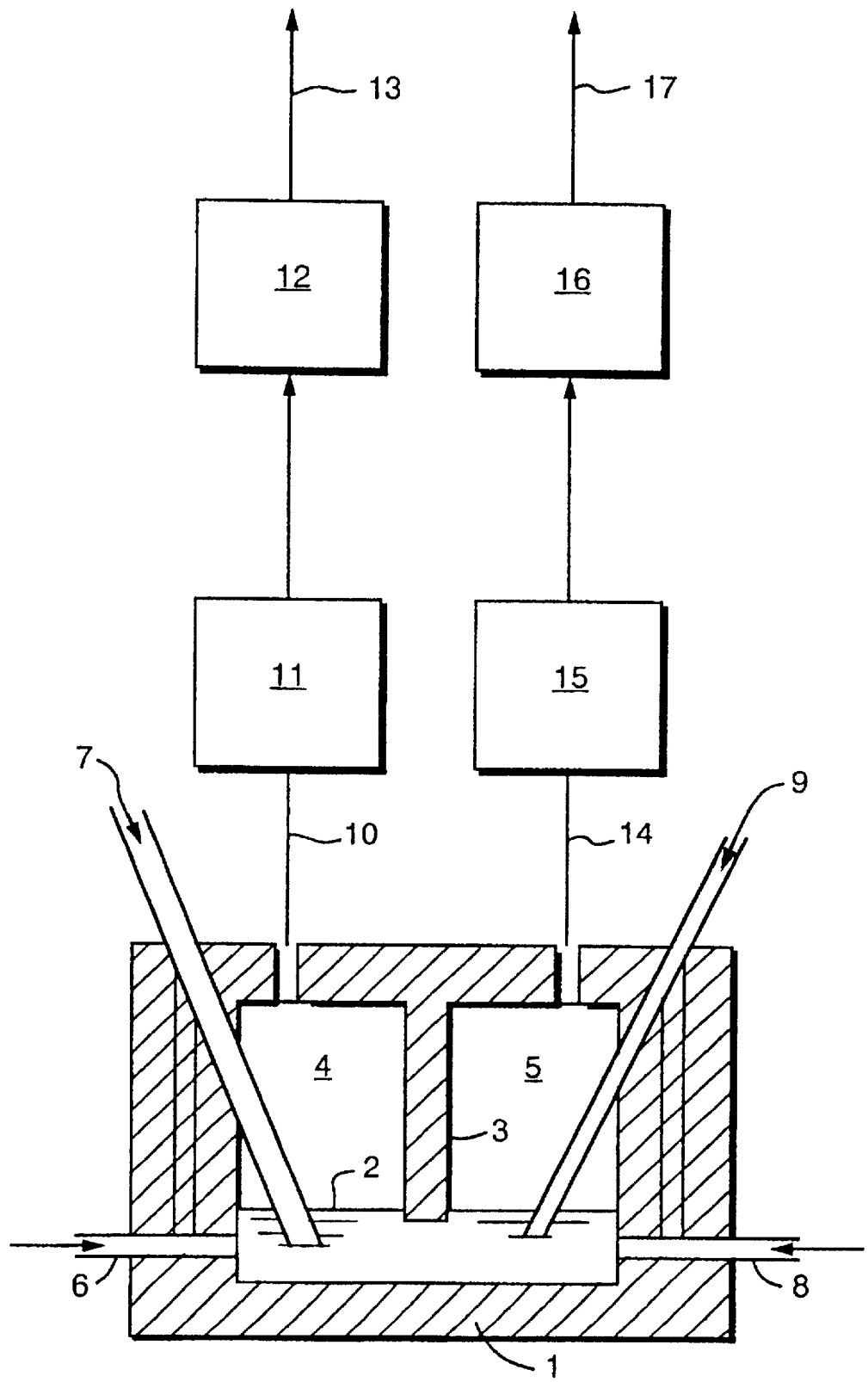
FIG. 2 is a drawing of a variation of the process of this invention incorporating scrubbing systems to remove hydrogen sulfide and other volatile sulfur compounds from the hydrogen-rich and carbon monooxide-rich gases made in the process.

FIG. 2 is drawing of a variation of the basic process. In addition to incorporating all the elements of FIG. 1 including the description above, in this variation the sulfur in the feed is allowed to build tip to equilibrium levels in the molten metal and slag in zones 4 and 5. At equilibrium, the sulfur compounds in the slag and metals will be converted to hydrogen sulfide and other volatile sulfur compounds in zones 4 and 5 and exit in the hydrogen-rich and carbon monoxide-rich gases via lines 10 and 14. After cooling in systems 11 and 15 the sulfur compounds are removed from the gases by conventional means such as amine scrubbing, caustic scrubbing, or other suitable sulfur compound removing devices, etc. in sulfur removal systems 12 and 16 before the now essentially sulfur-free gases enter the gas consuming processes via pipes 13 and 17. The advantage of this mode of operation is a reduced production of slag and reduced dust formation as shown in the prior art, U.S. Pat. No. 4,511,372 which is hereby incorporated by reference.

Figure 3:
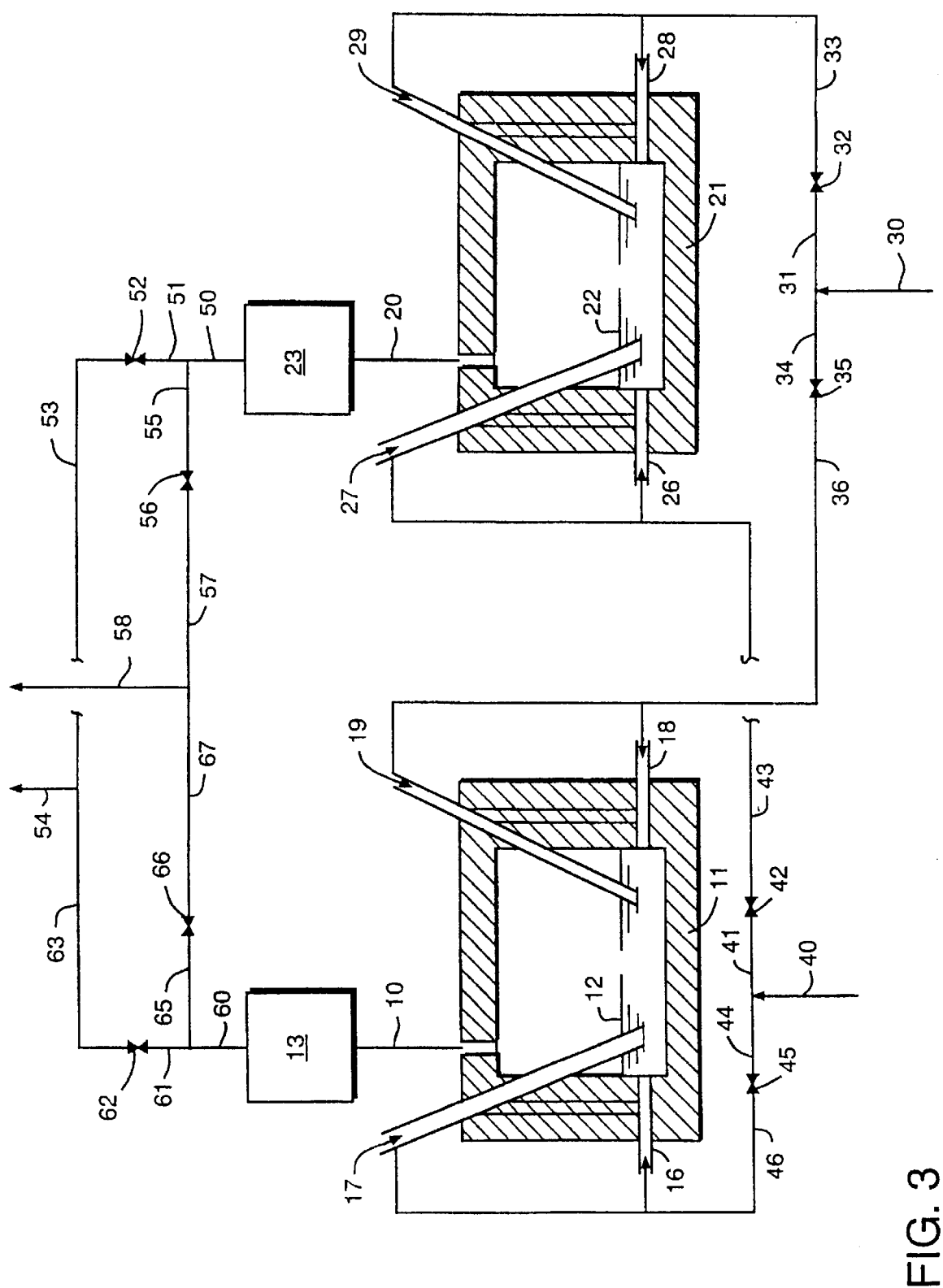
FIG. 3 is a drawing of a variation of the process of this invention incorporating the use of feed and product valving systems to/from two molten metal reactors to duplicate the effect of creating two molten metal zones separately by feed and product control systems instead of transferring the molten metal between two zones of a single reactors

FIG. 3 is a drawing of another variation of the process incorporation all of the applicable descriptions of FIGS. 1 and 2 and incorporating the use of feed and product valving systems to/from two molten metal reactors to duplicate the effect of creating two molten metal zones separated by feed and product control systems instead of transferring the molten metal between two zones of a single reactor.

In this variation, as shown in FIG. 3, the process comprises two (or more) identical systems performing functions comparable to the systems in FIGS. 1 and 2 and including: vessels 11 and 21 holding molten iron in baths 12 and 22; feed tuyere pipes 16 and 26 and alternative feed lance pipes 17 and 27 for introducing hydrocarbon feeds below the surface of the molten iron 12 and 22; feed tuyere pipes 18 and 28 and alternative feed lance pipes 19 and 29 for introducing oxygen below the surface of the molten iron 12 and 22; vessel exit pipes 10 and 20; gas cooling systems 13 and 23; and product gas pipes 60 and 50.

This system duplicates the two-zone reactor system of FIGS. 1 and 2 by creating the equivalent of two zones with the use of suitable valves and control systems on the feeds to vessels 11 and 21 and the product gases exiting the cooling systems 13 and 23 via pipes 60 and 50. Thus, the control systems are operated such that while hydrogen-rich gas is being made in vessel 11 and carbon monoxide-rich gas is being made in vessel 21. After an appropriate length of time operating in this mode the feed and product control systems switches the feeds and products and hydrogen-rich gas is made in vessel 21 and carbon monoxide-rich gas is made in vessel 11. The hydrocarbon feed system is described as follows: hydrocarbons are conducted to the system in pipe 40 which divides into pipes 41 and 44; pipe 49 leads to valve 42 and pipe 43 which is connected to tuyere pipe 26 or lance pipe 27 in vessel 21; pipe 44 leads to valve 45 and pipe 46 which is connected to tuyere pipe 16 or lance pipe 17 in vessel 11. The oxygen feed system is described as follows: oxygen is conducted to the system in pipe 30 which divides into pipes 31 and 34; pipe 31 leads to valve 32 and pipe 33 which is connected to tuyere pipe 28 or lance pipe 29 in vessel 21; pipe 34 leads to valve 35 and pipe 36 which is connected to tuyere pipe 18 or lance pipe 19 in vessel 11. The determination of whether hydrocarbons or oxygen are fed to either vessel 11 or 21 is determined by whether valves 32, 35, 42 and 45 are open or shut; these settings, in turn, being established by the control system.

The product gas systems from vessel 11 is described as follows: product gases exit vessel 11 via pipe 10, pass through cooling system 13 and enter pipe 60; the gases may then go via pipe 61 through valve 62 into pipe 63 amid pipe 54 connecting with the commercial processes using hydrogen-rich gas; or the gases may go via pipe 65 through valve 66 into pipe 67 and pipe 58 connecting with the commercial processes using carbon monoxide-rich gas. The product gas systems from vessel 21 is described as follows: product gases exit vessel 21 via pipe 20, pass through cooling system 23 and enter pipe 50; the gases may then go via pipe 51 through valve 52 into pipe 53 and pipe 54 connecting with the commercial processes using hydrogen-rich gas; or the gases may go via pipe 55 through valve 56 into pipe 57 and pipe 58 connecting with the commercial processes using carbon monoxide-rich gas. The routing of each gas is determined by whether valves 62, 66, 52 and 56 are open or shut; these settings, in turn, being established by the control system.

As an example of the operation of the system in FIG. 3, if hydrogen-rich gas were being produced in vessel 11 and carbon monoxide-rich gas were being produced in vessel 21, the following valves would be open; 45, 32, 62, 56, and closed; 42, 35, 66, 52. These valve settings would be reversed when hydrogen-rich gas were being produced in vessel 21 and carbon monoxide-rich gas were being produced in vessel 11. The system for FIG. 3 has been described in simple terms for the general concept. A more detailed description of the operation is given in U.S. Ser. No. 08/425,938, filed Apr. 19, 1995, which is incorporated by reference. This application also describes the use of three molten metal vessels, instead of two, with a similar valving and control system to permit continuous gasification operations when one reactor must be out of service for repairs, etc. This feature is also included in the present disclosure by reference.

Another variation of the process is to use an oxygen enriched gas as the source of oxygen through tuyere pipe 8 or lance pipe 9 (FIGS. 1 and 2) for gasifying the dissolved carbon in the molten metal in zone 5.

Another variation of the process is to use liquid feedstocks prior to their introduction to the system via tuyere pipe 6 or lance pipe 7 as a scrubbing medium in the cooling sections 11 and 15 for dust and fume removal from the hydrogen-rich and carbon monoxide-rich product gases exiting vessel 1 through pipes 10 and 14 (FIGS. 1 and 2).

Another variation of the process is to use a quantity of hydrogen-rich gas from pipe 13 (FIGS. 1 and 2) or elsewhere in the system to atomize liquid hydrocarbon feeds as they are introduced to zone 4 via tuyere pipe 6 or lance pipe 7.

Another variation of the process is to use a quantity of carbon monoxide-rich gas pipe 17 (FIGS. 1 and 2) or elsewhere in the system to cool tuyere pipe 8 or lance pipe 9 introducing the oxygen to the molten metal in zone 5.

Another variation of the process is to use a quantity of water vapor or steam to cool tuyere pipe 8 or lance pipe 9 introducing the oxygen to the molten metal in zone 5 and to moderate the temperature in zone 5.

Another variation of the process is to use a quantity of carbon dioxide gas to cool tuyere pipe 8 or lance pipe 9 introducing the oxygen to the molten metal in zone 5 and to moderate the temperature in zone 5.

Another variation of the process is to use a quantity of methane gas to cool tuyere pipe 6 or lance pipe 7 introducing the feed to the molten metal in zone 4 and to moderate the temperature in zone 4.

The following explanation details the importance to this invention of controlling the amount of oxygen introduced to the carbon monoxide-rich gas generation section such that the carbon content of the molten iron returned to the hydrogen-rich gas generation section is above a minimum value and thereby ensures that the hydrogen-rich gas contains a minimum of impurities. It also emphasizes the importance of these controls particularly when operating at the high pressures of this invention. Reference (by page number and/or figure number) are made to the data in the book, "The Making, Shaping and Treating of Steel", Tenth Edition, Copyright 1985 by Association of Iron and Steel Engineers.

The desired primary chemical reaction taking place in the hydrogen-rich gas generation section of this invention involves the gasification of a hydrocarbon feed ($CH_n$):

$$CH_n = n/2 H_2 \text{(hydrogen gas)} + C\text{-Fe (carbon dissolved in molten iron)} \quad (1)$$

However, two important and undesirable secondary reactions will take place between the carbon in the feed and any oxygen and iron oxide (FeO) which is present in the molten iron:

$$C + O\text{-Fe(oxygen dissolved in molten iron)} = CO\text{(carbon monoxide gas)} + Fe\text{(molten)} \quad (2)$$

$$C + FeO\text{(separate phase in molten iron)} = CO\text{(carbon monoxide gas)} + Fe\text{(molten)} \quad (3)$$

Reactions (2) and (3) are undesirable since carbon monoxide gas is generated which dilutes the hydrogen gas produced by reaction (1) and thereby requires more extensive hydrogen-rich gas purification facilities. In addition, it is known that FeO in a separate phase will attack refractory linings of vessels holding molten iron to a greater extent than just molten iron so that the conditions for Reaction 3 to take place should be minimized or eliminated, that is, there should be no separate FeO phase present with the molten iron.

Similarly, the desired chemical reaction taking place in the carbon monoxide-rich gas generation section of the invention involves the oxidation of the carbon dissolved in the molten iron coming from the hydrogen-rich gas generation section:

$$2C\text{-Fe(carbon dissolved in molten iron)} + O_2 = 2CO + Fe\text{(molten)} \quad (4)$$

Again, there are two undesirable secondary reactions which take place between the iron and the oxygen fed to this section:

$$Fe + O_2 = O\text{-Fe(oxygen dissolved in molten iron)} \quad (5)$$

$$2Fe + O_2 = 2FeO\text{(separate phase in molten iron)} \quad (6)$$

Note that the chemical elements shown in the above equations are illustrative of the materials involved and the processes taking place but may not necessarily represent the actual molecular species which may be present. For example, experimental evidence has shown that: a) oxygen dissolved in molten iron may be present as dissolved FeO or in other iron-oxygen ratios; b) carbon dissolved in molten iron may be present as dissolved FeC or in other iron/carbon ratios.

It is an important feature of this invention that the process must be controlled based on a complete understanding of the factors which control the degree to which all the above reactions, and in particular the secondary reactions (reactions 2, 3, 5, 6) will take place. The following quantitative relationships are critical to this understanding.

When oxygen and molten iron are present, oxygen is soluble to a limited extent in molten iron; the maximum solubility being 0.16% at 1527° C. (2781° F.) (page 405 in reference). Graphically, the solubility of oxygen at other temperatures is presented in FIG. 13–542 while mathematically it is described by (page 406):

$$\log[\text{wt. \% O}] = -6320/T(°K) + 2.734 \quad (7)$$

If more oxygen is added to molten iron than will be soluble according to the above, the oxygen reacts with the iron and a separate FeO phase is formed (page 405).

When oxygen and carbon and molten iron are present, the amount of oxygen in the molten iron as well as the amount of carbon in the molten iron are related according to the following reaction (page 674).

$$\text{CO(pressure above molten iron)} = \text{O} + \text{C(concentrations in molten iron)} \quad (8)$$

and equation $$K = [\text{wt. \% C}] \times [\text{wt. \% O}]/\text{Pco (partial pressure CO, atm)} \quad (9)$$

$$\log K = -1168/T(°K) - 2.07 \quad (10)$$

The fact that the concentrations of carbon and oxygen dissolved in molten iron are proportional to and affected by the partial pressure of the carbon monoxide above the molten iron is critical to the process control and successful commercial application of this invention. This trend is illustrated by the following example.

According to Equation 7 the solubility of oxygen in molten iron at 1482° C. (2700° F.) is 0.136 wt. %. Thus, if more than 0.136 wt. % oxygen is present in the molten iron, it will be present as a separate phase of FeO. According to Equation 9, the following amounts of oxygen will be present in molten iron at 1482° C. (2700° F.) when the molten iron contains 0.3 wt. % and 4.5 wt. % carbon at various pressures of carbon monoxide above the molten iron bath:

| CO Pressure, psia | wt. % O at 0.3% Carbon | wt. % O at 4.5% Carbon |
|---|---|---|
| 0.147 | 0.000061 | 0.000004 |
| 1.47 | 0.000613 | 0.000041 |
| 14.7 | 0.00613 | 0.00041 |
| 294.0 | 0.1226 | 0.0082 |
| 485.1 | 0.2023 | 0.0135 |
| 735.0 | 0.3060 | 0.0204 |

It is observed that, when the CO pressure is at 485.1 or 735.0 psia and the carbon in the molten iron is at 0.3 wt. %, the amount of oxygen is present in the molten iron is above 0.136 wt. % (the maximum solubility of oxygen) and thus a separate FeO phase will also be present. These are conditions under which the carbon monoxide-rich section of the invention could be operated and would be the composition of the molten iron circulated to the hydrogen-rich gas generation section. When circulated back to the hydrogen-rich gas generation section the pressure of the carbon monoxide would be minimum and the dissolved oxygen and FeO would react be released as carbon monoxide into the hydrogen-rich gas by Reactions 2 and 3 above and thereby dilute the hydrogen-rich gas. In addition the refractory holding the molten iron would be subject to attack by the FeO. Although, the amount of dissolved oxygen in the molten iron cannot be controlled, the amount of FeO as a separate phase can by controlling the amount of carbon in the molten iron in the carbon monoxide-rich gas generation section. This would be done by regulating the amount of oxygen introduced into the carbon monoxide-rich gas generation section such that the amount of carbon in the molten iron did not fall below a specific prescribed level for the given operating conditions. According to Equation 9 at 1482° C. (2700° F.) the amount of carbon in the molten iron to minimize the formation of a separate phase of FeO should be above 0.446 wt. % at 485.1 psia and 0.676 wt. % at 735 psia.

While using specific quantities for demonstration purposes, the above example illustrates the trends involved in the control of the operations of the invention but in no way limits the operating conditions to those shown. Other operating temperatures and pressures will determine appropriate carbon and oxygen content limitations for the molten iron.

What is claimed is:

1. A process for generating both a hydrogen-rich gas stream and a carbon monoxide-rich gas stream at a pressure in the range of 2 to 200 atmospheres, said process comprising:

a) introducing into a first molten metal zone, containing molten metal of at least 50% molten iron by weight, operating at 1200°–2500° C. (2192°–4532° F.) and at 2 to 200 atmospheres, a hydrocarbon feed in the form of a relatively dry, less than 1% by weight of water, gas or liquid or solid or solid-liquid slurry or atomized solid or liquid in a gas beneath the molten metal surface of the zone in which the hydrocarbon is converted to a hydrogen-rich gas which escapes from the surface of the molten metal, and to carbon which dissolves in the molten metal;

b) transferring at least a portion of the molten metal of the first molten metal zone to a second molten metal zone; reducing the carbon content of the molten metal of the second molten metal zone by adding a controlled amount of an oxygen containing stream to oxidize carbon in the molten metal of the second molten metal zone and to produce a carbon monoxide-rich gas stream;

c) recycling at least a portion of the molten metal of the second molten metal zone back to the first molten metal zone such that the amount of carbon in the molten iron which is returned to the first zone from the second zone is controlled to be above 0.3 wt. % to minimize formation of a high level of FeO, ferrous oxide which high level causes formation of a separate phase of FeO or reaction with carbon in the hydrocarbon feed;

d) passing said separate hydrogen-rich gas and carbon monoxide-rich gas streams out of their respective zones and cooling them to temperatures suitable for their introduction into commercial hydrogen-rich gas and carbon monoxide-rich gas consuming processes and controlling the pressure of each gas stream at above 2 atmospheres;

e) removing sulfur in the feed via its capture in a slag floating on the molten iron in both zones or allowing the sulfur to build up to equilibrium levels in the molten iron and leave as hydrogen sulfide or other volatile sulfur compounds in the hydrogen-rich and carbon monoxide-rich gas streams;

f) removing dust and fume generated as part of the process in the molten metal zones generating the hydrogen-rich and carbon monoxide-rich gas streams via conventional means which are part of a gas cooling system.

2. The process as defined in claim 1 in which the molten metal is selected from the group consisting of iron, copper, zinc, chromium, manganese, and nickel.

3. The process as defined in claim 2 in which suitable feeds for the process include carbonaceous reactant feedstocks selected from the group consisting of: light gaseous hydrocarbons heavier liquid hydrocarbons; solid hydrocarbon and mixtures of the foregoing.

4. The process as defined in claim 1 in which all the sulfur in the feed is allowed to build up to equilibrium levels in the molten metal and slag zones at which point the sulfur compounds in the slag and metals will be converted to hydrogen sulfide and other volatile sulfur compounds in molten metal and slag zones and exit with the hydrogen-rich and carbon monoxide-rich gases; and after cooling the sulfur compounds are removed from the gases by conventional means before the now essentially sulfur-free gases pass to the commercial gas consuming processes.

5. The process as defined in claim 1 wherein each molten metal zone is within an individual molten metal reactor.

6. The process as defined in claim 1 incorporating the use of an oxygen enriched gas as the source of oxygen for oxidizing the dissolved carbon in the molten metal in the second molten metal zone.

7. The process as defined in claim 1 wherein said adding of a controlled amount of an oxygen containing stream is carried out through a submerged lance entering the molten metal in the second molten metal zone through the top surface of molten metal of the second molten metal zone.

8. The process as defined in claim 1 incorporating the use of liquid feed stocks prior to their introduction to the first molten metal zone as a scrubbing medium in the cooling for dust and fume removal from the hydrogen-rich and carbon monoxide-rich product gases.

9. The process as defined in claim 1 incorporating the use of a quantity of hydrogen-rich gas to atomize liquid hydrocarbon feeds as they are introduced into the first molten metal zone.

10. The process as defined in claim 1 incorporating the use of a quantity of carbon monoxide-rich gas to cool a tuyere pipe introducing said controlled amount of an oxygen-containing stream from below the molten metal surface of the second molten metal zone or a lance introducing said controlled amount of an oxygen-containing stream from above the molten metal surface of the second molten metal zone.

11. The process as defined in claim 1 incorporating the use of a quantity of water vapor or steam to cool a tuyere pipe introducing said controlled amount of an oxygen-containing stream from below the molten metal surface in the second molten metal zone or a lance introducing said controlled amount of an oxygen-containing stream from above the molten metal surface in the second molten metal zone and to moderate the temperature in the second molten metal zone.

12. The process as defined in claim 1 incorporating the use of a quantity of carbon dioxide gas to cool a tuyere pipe introducing said controlled amount of an oxygen-containing stream from below the molten metal surface in the second molten metal zone or a lance introducing said controlled amount of an oxygen-containing stream from above the molten metal surface in the second molten metal zone and to moderate the temperature in the second molten metal zone.

13. The process as defined in claim 1 incorporating the use of a quantity of methane gas to cool a tuyere pipe introducing the feed from below the molten metal surface in the first molten metal zone or a lance introducing the feed from above the molten metal surface in the first molten metal zone and to moderate the temperature in the first molten metal zone.

14. The process as defined in claim 3 wherein said light gaseous hydrocarbons are selected from the group consisting of methane, ethane, propane, butane, natural gas, and refinery gas; said heavier liquid hydrocarbons are selected from the group consisting of naphtha, kerosene, asphalt, hydrocarbon residua produced by distillation or other treatment of crude oil, fuel oil, cycle oil, slurry oil, gas oil, heavy crude oil, pitch, coal tars, coal distillates, natural tar, crude bottoms, and used crankcase oil; and said solid hydrocarbon is selected from the group consisting of coal, rubber, tar sand, oil shale, and hydrocarbon polymers.

15. The process as defined in claim 4 wherein said conventional means of removing sulfur compounds from said gases is selected from the group consisting of amine scrubbing and caustic scrubbing.

16. The process as defined in claim 1 wherein said adding of a controlled amount of an oxygen containing stream is carried out through a tuyere pipe.

17. The process as defined in claim 1 wherein said adding of a controlled amount of an oxygen containing stream is carried out through a means selected from the group consisting of a lance pipe and a tuyere pipe.

18. The process of claim 1 wherein said first molten metal zone operates at a temperature of 1482°–2500° C. (2700°–4532° F.).

* * * * *